US010196904B2

(12) United States Patent
Heffernan et al.

(10) Patent No.: US 10,196,904 B2
(45) Date of Patent: Feb. 5, 2019

(54) TURBINE ENDWALL AND TIP COOLING FOR DUAL WALL AIRFOILS

(71) Applicants: Rolls-Royce North American Technologies Inc., Indianapolis, IN (US); Rolls-Royce Corporation, Indianapolis, IN (US)

(72) Inventors: Tab M. Heffernan, Plainfield, IN (US); Jeffrey F. Rhodes, Zionsville, IN (US); Douglas D. Dierksmeier, Franklin, IN (US); Okey Kwon, Indianapolis, IN (US)

(73) Assignees: ROLLS-ROYCE NORTH AMERICAN TECHNOLOGIES INC., Indianapolis, IN (US); ROLLS-ROYCE CORPORATION, Indianapolis, IN (US)

( * ) Notice: Subject to any disclaimer, the term of this patent is extended or adjusted under 35 U.S.C. 154(b) by 303 days.

(21) Appl. No.: 15/004,970

(22) Filed: Jan. 24, 2016

(65) Prior Publication Data
US 2017/0211395 A1 Jul. 27, 2017

(51) Int. Cl.
| F01D 5/18 | (2006.01) |
| F01D 9/04 | (2006.01) |
| F01D 25/12 | (2006.01) |
| F01D 5/14 | (2006.01) |

(52) U.S. Cl.
CPC .............. *F01D 5/187* (2013.01); *F01D 5/147* (2013.01); *F01D 9/041* (2013.01); *F01D 25/12* (2013.01); *F05D 2220/32* (2013.01); *F05D 2240/81* (2013.01); *F05D 2260/20* (2013.01); *F05D 2260/221* (2013.01)

(58) Field of Classification Search
CPC .......... F01D 5/187; F01D 5/188; F01D 5/189; F01D 5/20
See application file for complete search history.

(56) References Cited

U.S. PATENT DOCUMENTS

| 4,480,956 A | 11/1984 | Krüger et al. |
| 6,213,714 B1 | 4/2001 | Rhodes |
| 7,217,096 B2 | 5/2007 | Lee |
| 7,249,933 B2 | 7/2007 | Lee et al. |

(Continued)

OTHER PUBLICATIONS

Extended European Search Report, dated May 30, 2017, pp. 1-6, issued in European Patent Application No. 17152011.7, European Patent Office, Munich, Germany.

*Primary Examiner* — Justin Seabe
(74) *Attorney, Agent, or Firm* — Brinks Gilson & Lione

(57) ABSTRACT

An airfoil may include a spar comprising a passageway inside of the spar for a cooling fluid, a pedestal on an outer surface of the spar, and an inlet configured to direct the cooling fluid from the passageway to the outer surface of the spar. The airfoil may further include a coversheet, wherein an inner surface of the coversheet is positioned on the pedestal of the spar and an edge of the coversheet is positioned along an end of the spar. The inner surface of the coversheet, the pedestal, and the outer surface of the spar may define a cooling path from the inlet to an outlet at the edge of the coversheet. The outlet at the edge of the coversheet may be configured to direct cooling fluid onto the end of the spar, onto a footing, and/or onto a fillet positioned along an intersection of the footing and the spar.

15 Claims, 3 Drawing Sheets

(56) References Cited

U.S. PATENT DOCUMENTS

| | | |
|---|---|---|
| 7,278,827 B2 | 10/2007 | Boury et al. |
| 7,497,660 B2 | 3/2009 | Liang |
| 7,862,299 B1 | 1/2011 | Liang |
| 7,905,706 B1 * | 3/2011 | Liang .................. F01D 5/14 415/115 |
| 8,015,705 B2 | 9/2011 | Wilson, Jr. et al. |
| 8,100,654 B1 * | 1/2012 | Liang .................. F01D 5/187 416/97 R |
| 8,197,211 B1 | 6/2012 | Liang |
| 8,366,394 B1 | 2/2013 | Liang |
| 8,435,004 B1 | 5/2013 | Liang |
| 8,439,643 B2 | 5/2013 | Kuhne et al. |
| 8,491,263 B1 | 7/2013 | Liang |
| 8,616,845 B1 | 12/2013 | Liang |
| 8,721,285 B2 | 5/2014 | Liang |
| 8,858,159 B2 | 10/2014 | Piggush et al. |
| 8,961,133 B2 | 2/2015 | Kwon |
| 9,085,988 B2 | 7/2015 | Kwon et al. |
| 9,091,177 B2 | 7/2015 | Quach |
| 9,115,590 B2 | 8/2015 | Spangler et al. |
| 9,157,329 B2 | 10/2015 | Nadeau et al. |
| 2011/0305580 A1 | 12/2011 | Wilson, Jr. et al. |
| 2012/0070308 A1 * | 3/2012 | Naik .................. F01D 5/20 416/97 R |
| 2014/0047842 A1 | 2/2014 | Chlus et al. |
| 2014/0093390 A1 | 4/2014 | Pointon et al. |
| 2014/0169962 A1 | 6/2014 | Lee |
| 2014/0234088 A1 * | 8/2014 | Brandl .................. F01D 5/081 415/177 |
| 2014/0271226 A1 | 9/2014 | Giglio et al. |
| 2015/0267557 A1 | 9/2015 | Facchinetti et al. |

* cited by examiner

TURBINE ENDWALL AND TIP COOLING FOR DUAL WALL AIRFOILS

TECHNICAL FIELD

This disclosure relates to airfoils, and more particularly to cooling airfoils.

BACKGROUND

Present approaches to cooling an airfoil used in high temperature environments suffer from a variety of drawbacks, limitations, and disadvantages. There is a need for the inventive cooling components, apparatuses, systems and methods disclosed herein.

BRIEF SUMMARY

An airfoil for a gas turbine engine may be provided. The airfoil may include a spar. The spar may include a passageway inside of the spar for a cooling fluid, a pedestal on an outer surface of the spar, and an inlet configured to direct the cooling fluid from the passageway to the outer surface of the spar. The airfoil may additionally include a coversheet. An inner surface of the coversheet may be positioned on the pedestal of the spar. An edge of the coversheet may be positioned along an end of the spar. The inner surface of the coversheet, the pedestal, and the outer surface of the spar may define a cooling path from the inlet to an outlet at the edge of the coversheet. The cooling path may be unobstructed from the inlet to the outlet.

An airfoil cooling system for an airfoil may be provided. The airfoil cooling system may include a spar. The spar may include a passageway for a cooling fluid, a pedestal arrangement on an outer surface of the spar, and an inlet configured to direct the cooling fluid from the passageway to a cooling path defined by the outer surface of the spar and the pedestal arrangement. The airfoil cooling system may additionally include a footing that extends radially from the spar. The cooling path may be configured to guide the cooling fluid from the inlet to an outlet that opens towards the footing.

An airfoil cooling system for an airfoil may be provided. The airfoil cooling system may include a spar. The spar may include a passageway for a cooling fluid, a pedestal on an outer surface of the spar, and an inlet configured to receive the cooling fluid from the passageway into a cooling path defined by the outer surface of the spar and the pedestal. The cooling path may extend from the inlet to an outlet. The outlet may be configured to direct the cooling fluid from between the outer surface of the spar and a coversheet onto a tip of the spar. The inlet may have a width. A center of the inlet may be located a distance from the outlet. A ratio of the distance to the width may be in a range from 0.5 to 20.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

An airfoil, such as a vane or a blade, which is located in a hot section of a gas turbine engine, may be cooled by forcing a cooling fluid into an inner portion of the airfoil and out holes on an outer surface of a covering of the airfoil. Although the holes formed on the outer surface of a covering of the airfoil may generally cool some exterior portions of the airfoil, such an arrangement may fail to adequately cool other locations, such as on either end of the airfoil.

In one example to address these problems, an airfoil for a gas turbine engine may be provided that comprises a spar that includes a passageway inside of the spar for a cooling fluid, a pedestal on an outer surface of the spar, and an inlet configured to direct the cooling fluid from the passageway to the outer surface of the spar. The airfoil may also include a coversheet. An inner surface of the coversheet may be positioned on the pedestal of the spar, and an edge of the coversheet may be positioned along an end of the spar. The inner surface of the coversheet, the pedestal, and the outer surface of the spar define a cooling path from the inlet to an outlet at the edge of the coversheet. The cooling path may be unobstructed from the inlet to the outlet at the edge of the coversheet. In other words, the cooling path may be on a straight line that extends from the inlet to the outlet without any obstructions along the straight line. Alternatively or in addition, the inlet may be located within a predetermined distance of the outlet so that the cooling fluid exiting the outlet is cool enough at the edge of the coversheet to adequately cool the end of the airfoil.

The result may be a cooling path and an outlet at the edge of a coversheet that cools predetermined airfoil locations and neighboring regions. For example, the cooling path and the outlet may direct cooling fluid onto the tip of the airfoil. Alternatively or in addition, the cooling path and the outlet may direct the cooling fluid onto a footing of the airfoil and/or onto an intersection between the spar and the footing of the airfoil. The footing may be an endwall of a turbine vane or a platform of a turbine blade, for example. Alternatively or in addition, the cooling fluid may cool airfoil components and neighboring regions along the cooling path.

Figure 1:
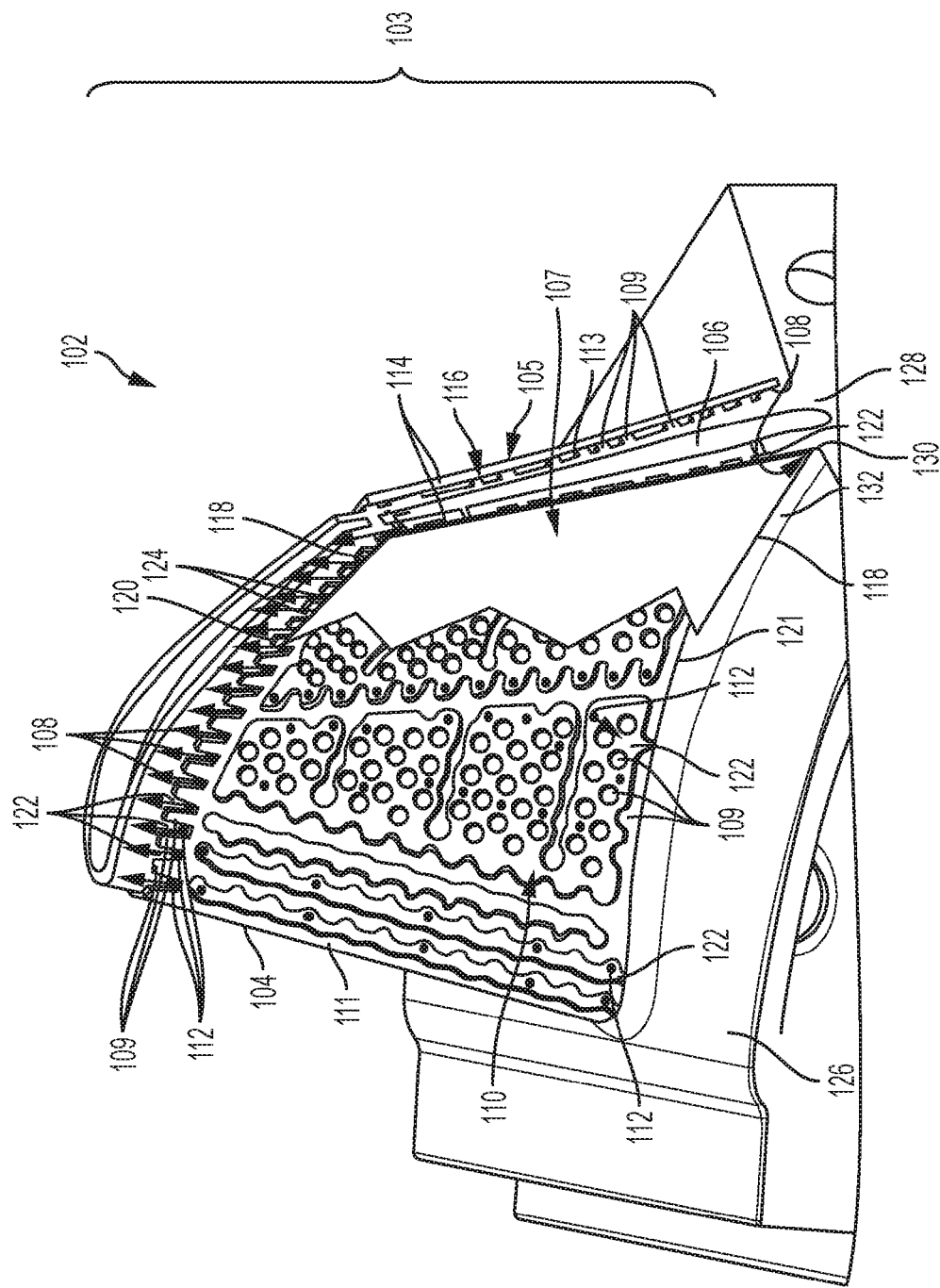
FIG. 1 illustrates an example of an airfoil cooling system.

FIG. 1 illustrates an example of an airfoil cooling system 102 that includes an airfoil 103 and a footing 126. The airfoil 103 may comprise a spar 104, a suction side 105, a pressure side 107, a leading edge 111, and a trailing edge 113. The spar 104 may comprise a passageway 106 for a cooling fluid 108, pedestals 109 on an outer surface 110 of the spar 104, and an inlet 112 configured to direct the cooling fluid 108 from the passageway 106 to the outer surface 110 of the spar 104. The airfoil 103 may further comprise a coversheet 114 (only a portion shown in FIG. 1), where an inner surface 116 of the coversheet 114 is positioned on the pedestals 109 of the spar 104. An edge 118 of the coversheet 114 may be positioned along an end 120, 121 of the spar 104, where the inner surface 116 of the coversheet 114, the pedestals 109, and the outer surface 110 of the spar 104 define a cooling path 122 from the inlet 112 to an outlet 124 at the edge 118 of the coversheet 114. The spar 104 may further comprise a root 128 that penetrates the footing 126. The footing 126 may extend radially from the spar 104 where an intersection 130 of the spar 104 and the footing 126 may be a fillet 132.

The airfoil cooling system 102 may be a system to cool the airfoil 103, the footing 126, the fillet 132, and/or other neighboring regions that are adjacent to the airfoil 103. For example, the airfoil cooling system 102 may be coupled to a rotating structure in a turbine where the airfoil 103 may be a blade and the footing 126 may be a platform. Additionally or alternatively, the airfoil cooling system 102 may be coupled to a static structure, for example, a nozzle, where the airfoil 103 may be a vane or a stator. The airfoil 103 may encompass embodiments that include static and/or rotating components configured to guide airflow or drive an axle.

The spar 104 may be a structural member of the airfoil 103 that provides mechanical support to the airfoil 103. The spar 104 may define the general shape and contours of the airfoil 103. The spar 104 may define the shape of the suction side 105, the pressure side 107, the leading edge 111, and/or the trailing edge 113 of the airfoil 103. The spar 104 may be unitary structure or a combination of individual members. For example, the spar 104 may be a series of cross sections of a predefined width joined together. As another example, the spar 104 may be a combination of sections, such as the suction side 105 and the pressure side 107, joined together during manufacturing. Additionally or alternatively, the spar 104 may include flow channels on the inside of the spar 104 and apertures on the outer surface 110 of the spar 104 that are connected with the flow channels. The flow channels may direct the cooling fluid 108 to portions of the spar 104. The number, shape, orientation, and size of the flow channels may depend on cooling requirements, structural requirements, and other design considerations. The spar 104 may include support members. The support members may add support to the spar 104 and/or define flow channels inside of the spar 104. For example, the spar 104 may have multiple support members that strengthen the spar 104 and define a series of flow channels and serpentine flow channels connected together within the spar 104. As another example, the spar 104 may be a hollow shell with an internal cavity defining a single flow channel. The spar 104 may be constructed of metal, metal alloy, or any other type of suitable material.

The end 120,121 of the spar 104 may be the tip 120 or the base 121 of the spar. Alternatively or in addition, the end 120,121 of the airfoil 103 may be the tip 120 or the base 121 of the airfoil 103. The tip 120 of the spar 104 or the airfoil 103 may be the end of the spar 104 or the airfoil 103 distally extended from the base 121 of the spar 104 or the airfoil 103. The tip 120 of the spar may be the distal ends of the suction side 105, the pressure side 107, the leading edge 11, and the trailing edge 107. For example, the tip 120 of the spar 104 or the airfoil 103 may be the tip 120 of the blade that runs along a chamber wall. The base 121 of the spar 104 may be the end of the spar that intersects the footing 126 and/or any other component to which the spar 104 or the airfoil 103 is mounted. The base 121 of the spar 104 may be the ends of the suction side 105, the pressure side 107, the leading edge 111, and the trailing edge 107 that intersect the footing 126 and/or the other component connected with the spar 104. For example, the base 121 of the spar 104 may be the intersection 130 of the blade and the platform.

The footing 126 may intersect the base of the spar 104 and radially extend from the spar 104. The footing 126 may include flow channels coupled to a cooling fluid source. The flow channels of the footing 126 may be coupled to the passageway 106 of the spar 104 so that cooling fluid may flow from the cooling fluid source into the passageway 106 of the spar 104. The footing 126 may be positioned at various locations inside of a gas turbine engine. For example, the footing 126 may be located in-between the combustion chamber and the exhaust portion of a gas turbine engine. Examples of the footing 126 may include a platform coupled to a rotor assembly and an endwall coupled to a static portion of a turbine section in the gas turbine engine. The footing 126 may be configured to receive the root 128 of the spar 104. Alternatively, the spar 104 and the footing 126 may be manufactured as a single unitary structure.

The fillet 132 may be a region along the intersection 130 of the spar 104 and the footing 126. For example, the fillet 132 may be a curved region along the intersection 130 of the spar 104 and the footing 126. The fillet 132 may be tapered thereby directing cooling fluid away from the intersection 130 of the spar 104 and the footing 126. For example, the fillet 132 may be rounded along the intersection 130. The fillet 132 may be cast with the spar 104 and the footing 126, alone or in combination. Alternatively or in addition, the spar 104, the footing 126, and the fillet 132 may be individually manufactured and assembled. The fillet 132 may extend along the intersection 130 of the spar 104 and the footing 126 on the suction side 105, the pressure side 107, the leading edge 111, and/or the trailing edge 113 of the airfoil 103.

The spar 104 may include the passageway 106 to direct the cooling fluid 108 inside of the spar 104. The passageway 106 may be a single passageway or a combination of multiple passageways. Examples of the passageway 106 include a single cavity located within the spar 104, main cooling channels connected with serpentine cooling channels, and/or other combinations of passageways that are shaped, oriented, and sized to fit the cooling requirements and/or other design considerations of the airfoil 103. The passageway 106 may extend into the root 128 of the spar 104. The passageway 106 may be connected with a cooling fluid source. For example, the passageway 106 may be connected with the passageway inside of the footing 126 and the cooling fluid 108 originating in a compression chamber of a gas turbine engine may pass through the passageway in the footing 126 and into the passageway 106 of the spar 104.

The pedestals 109 may be a raised portion on the outer surface 110 of the spar 104. The outer surface 110 of the spar 104 may contain a single pedestal or multiple pedestals 109. Any one or more of the pedestals 109 may partially or completely define the cooling path 122 along the outer surface 110 of the spar 104. The size, number, spacing, and shape of the pedestals 109 may vary across the outer surface 110 of the spar 104. For example, the pedestals 109 at the tip 120 of the spar 104 may define a series of straight cooling paths that direct the cooling fluid 108 toward the tip 120 of the spar 104. Alternatively or in addition, the pedestals 109 at the base 121 of the spar 104 may be an arrangement of circular pedestals 109 to indirectly guide the cooling fluid 108 toward the base 121 of the spar 104. Other shapes and arrangements of pedestals 109, both uniform and non-uniform, may be used to define the cooling path 122 and direct the cooling fluid 108 to specific portions of the spar 104. Any of the pedestals 109 may be formed of any material to transfer heat and/or to provide structural support for the coversheet 114. For example, the pedestals 109 may be formed of a conductive material and the cooling fluid may transfer heat away from the pedestals 109. Alternatively or in addition, the pedestals 109 may draw heat from the cooling fluid. The pedestals 109 may be coupled to the outer surface 110 of the spar 104 and/or the inner surface 116 of the coversheet 114. For example, the pedestals 109 may be bonded with the inner surface 116 of the coversheet 114. Additionally or alternatively, the pedestals 109 may be conductively coupled to the surface of the spar so as to transfer heat to the spar 104. Alternatively or in addition, the pedestals 109 may be conductively coupled to the inner surface 116 of the coversheet 114 to transfer heat away from the coversheet 114.

The coversheet 114 may be a wall or a sheet on the outermost portion of the airfoil 103. The coversheet 114 may be a sheet coupled to, and/or mounted on, the pedestals 109 on the outer surface 110 of the spar 104. The coversheet 114 may wrap around the leading edge 111 and/or the trailing edge 113 of the spar 104. The coversheet 114 may extend along the pressure side 107 and/or the suction side 105 of the spar 104. The edge 118 of the coversheet 114 may be flush with the end 120, 121 of the spar 104. Additionally or alternatively, the edge 118 of the coversheet 114 may be offset from the tip 120 of the spar 104 and/or the base 121 of the spar 104. For example, the edge 118 of the coversheet 114 may be recessed from the tip 120 of the spar 104 by a range of 0.30 to 3 millimeters. The inner surface 116 of the coversheet 114 may be coupled to the pedestals 109 by any manufacturing technique known in the art. For example, the inner surface 116 of the coversheet 114 may be bonded to the pedestals 109 by a bonding process. Additionally or alternatively, the coversheet 114 may be conductively coupled to the pedestals 109 to transfer heat away from the coversheet using the pedestals 109. The cooling path 122 may be defined in part by a portion of the coversheet. Additionally or alternatively, the outlet 124 may be defined in part by a portion of the coversheet 114. For example, the inner surface 116 of the coversheet 114, the outer surface 110 of the spar 104, and an arrangement of the pedestals 109 may together define the cooling path 122. The edge 118 of the coversheet 114, the outer surface 110 of the spar 104, and the pedestals 109 together may define the outlet 124.

The inlet 112 may be an opening positioned on the outer surface 110 of the spar 104 that releases the cooling fluid 108 from an interior of the spar 104. The inlet 112 may extend from the outer surface 110 of the spar 104 into the passageway 106 of the spar 104. Additionally or alternatively, the inlet 112 may form a portion of the passageway 106 of the spar 104. The inlet 112 may receive the cooling fluid 108 from the passageway 106 of the spar 104 and direct the cooling fluid 108 to the outer surface 110 of the spar 104. The shape, size, and location of the inlet 112 may vary depending on cooling, structural, and other design considerations. Examples of the inlet 112 may include circles, squares, rectangles, slots, or any other regular or non-regular shape. Additionally or alternatively, one end of the inlet 112 may be narrower than the other end of the inlet 112. Multiple inlets may be positioned at various locations along the outer surface 110 of the spar 104. For example, a series of the multiple inlets may be located along the tip 120 of the spar 104. In another example, a series of the multiple inlets may be positioned along the base 121 of the spar 104.

The outlet 124 may be an opening defined on the airfoil 103 to cool a predetermined region of the airfoil 103 and/or areas neighboring or adjacent to the outlet 124. The outlet 124 may be defined by the outer surface 110 of the spar 104, any portion of the coversheet 114, and/or one or more of the pedestals 109. The shape of the outlet 124 may a circle, rectangle, slot, oval, or any other geometric or non-geometric shape. For example, the outlet 124 may have a rectangular opening defined by the outer surface 110 of the spar 104, the edge 118 of the coversheet 114, and one of the pedestals 109 at the end 120,121 of the spar 104. As another example, the outlet 124 may be defined by outer surface 110 of the spar 104 and the pedestals 109. As another example, the outlet 124 may be defined in one of the pedestals 109. The outlet 124 or multiple outlets may be positioned at various locations on the airfoil 103. The shape, orientation, size, and other properties of the outlets may vary according to cooling, structural, and other design considerations. The multiple outlets may be grouped together to cool a predefined portion of the airfoil 103. For example, a series of outlets may be located along the edge 118 of the coversheet 114 at the tip 120 of the spar 104. In another example, the series of outlets may be located along the edge 118 of the coversheet 114 at the base 121 of the spar 104.

The outlet 124 may direct the cooling fluid 108 onto the end 120, 121 of the airfoil 103 and or neighboring areas. The outlet 124 may direct the cooling fluid 108 onto the tip 120 of the spar 104. Additionally or alternatively, the outlet 124 may direct the cooling fluid 108 onto the base 121 of the spar 104, onto the footing 126, and/or onto the fillet 132. The direction and reach of the cooling fluid 108 exiting the outlet 124 may be determined in part by the size, shape, and orientation of the outlet 124. For example, the outlet 124 that narrows with the direction of flow may deliver the cooling fluid 108 to a predetermined area whereas the outlet 124 that expands with the direction of flow may deliver the cooling fluid 108 to a more expansive area than the predetermined area. Additional factors may influence the direction and reach of the cooling fluid 108 exiting the outlet 124. Such factors may include, for example, the offset of the outlet 124 from the end 120, 121 of the spar 104, the distance of the inlet 112 from the outlet 124, the shape of the cooling path 122, the degree to which the coversheet 114 overlaps the pedestals 109, and/or the differential pressure internal and external to the airfoil cooling system 102.

The cooling path 122 may be a path on the outer surface 110 of the spar 104 to direct the cooling fluid 108 to any portion of the airfoil 103 or to a region adjacent to the outlet 124 of the cooling path 122. The cooling path 122 may be defined by the outer surface 110 of the spar 104 and any of the pedestals 109. The inner surface 116 of the coversheet 114 may further define the cooling path 122. The cooling path 122 may direct the cooling fluid 108 from the inlet 112 to the outlet 124 or to multiple outlets. The airfoil 103 may contain multiple cooling paths. One or more of the multiple cooling paths may intersect in some examples. The dimensions, shape, location, and direction of the cooling path 122 depend on cooling, structural, and other design considerations. For example, the cooling path 122 may be located so as to direct the cooling fluid 108 toward the tip 120 of the spar 104. The cooling path 122 may be unobstructed from the inlet 112 to the outlet 124. As another example, multiple cooling paths may converge to define a combined cooling path. The cooling path 122 from the inlet 112 to the outlet 124 may be curved, linear, narrowed, expanding, narrowing, or any other dimension and or shape. For example, the cooling path 122 may wrap around the pedestals 109 toward the outlet. As another example, the cooling path 122 may extend through any of the pedestals 109.

The cooling fluid 108 may be any compressible gaseous or non-gaseous fluid. Examples of the cooling fluid 108 may include air, cooling air, and cooled cooling air. The cooling fluid may 108 be air originating outside of the airfoil cooling system 102. The cooling fluid 108 may be augmented for improved cooling, flow, and other design considerations. The cooling fluid 108 may be pressurized in a compressor, for example, and transferred into to the passageway 106 of the spar 104. A differential pressure of the cooling fluid 108 between the passageway 106 and an exterior of the airfoil cooling system 102 may cause the cooling fluid 108 to flow through the inlet 112, along the cooling path 122, through the outlet 124, and onto the end 120, 121 of the spar 104.

Figure 2:
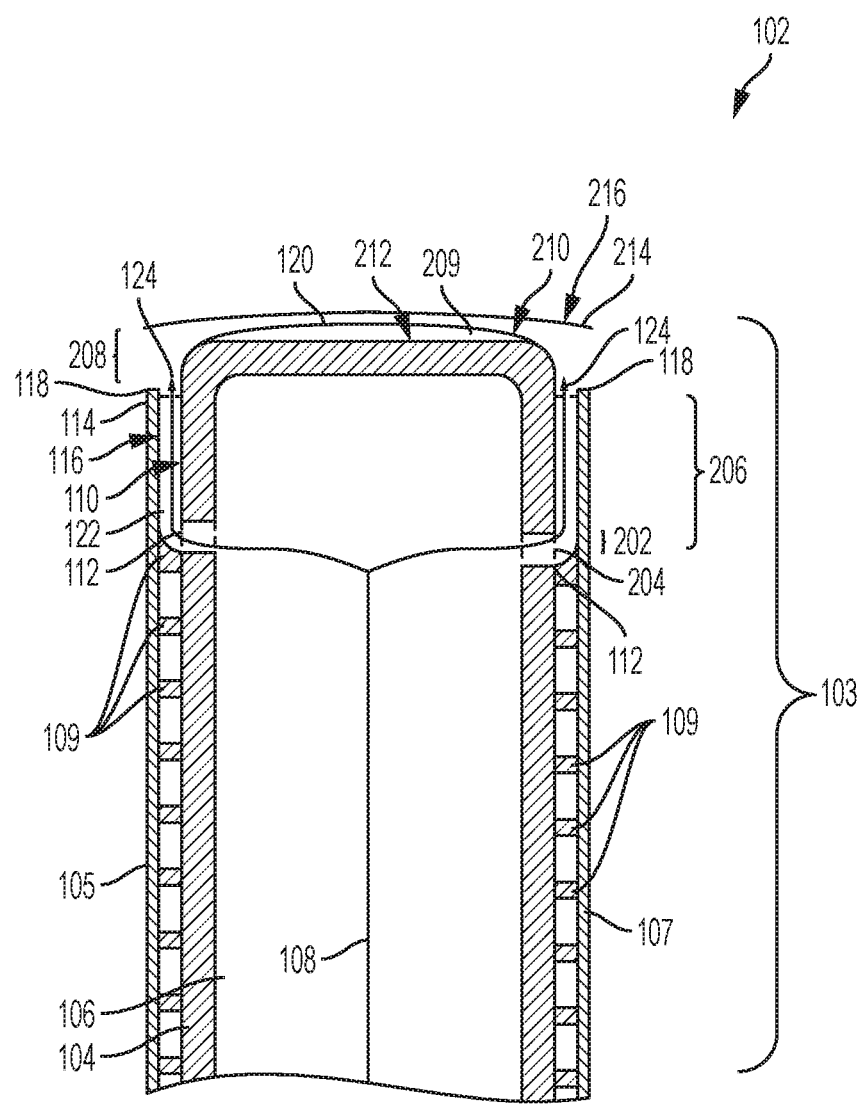
FIG. 2 illustrates an example of a cross-sectional view of the tip of the spar, pedestals, and coversheet of the airfoil in the airfoil cooling system.

FIG. 2 illustrates an example of a cross-sectional view of the tip 120 of the spar 104 and the tip 120 of the airfoil 103 in the airfoil cooling system 102. The airfoil 103 includes the suction side 105 and the pressure side 107. The spar 104 may comprise the passageway 106 to direct the cooling fluid 108 from the passageway 106 to the cooling path 122 defined by the pedestals 109, the inner surface 116 of the coversheet 114, and the outer surface 110 of the spar 104. The cooling path 122 may extend from the inlet 112 to the outlet 124. The outlet 124 may be configured to direct the cooling fluid 108 from between the outer surface 110 of the spar 104 and the coversheet 114 onto the tip 120 of the spar 104. The inlet 112 may have a width 202, D, and a center 204. The center 204 of the inlet 112 may be located a distance 206, L, from the outlet 124. The coversheet 114 may include the inner surface 116 and the edge 118. The outlet 124 may be located at the edge 118 of the coversheet 114. The edge 118 of the coversheet 114 may be recessed from the tip 120 of the spar 104 by an exposure 208. The spar 104 may further comprise a break-in portion 209 at the tip 120 of the spar 104. The airfoil 103 may be configured to be located adjacent to a chamber wall 214 having a surface 216 that faces the tip 120 of the spar 104.

The width 202, D, of the inlet 112 may be measured at the outer surface 110 of the spar 104. For example, if the inlet 112 has a circular opening at the outer surface 110 of the spar 104, the width 202, D, of the inlet 112 may be the diameter of the circle.

The inlet 112 may be located the distance 206, L, from the outlet 124. The distance 206, L, may extend from the center 204 of the inlet 112 to the outlet 124. Additionally or alternatively, the distance 206, L, may extend from the center 204 of the inlet 112 to the edge 118 of the coversheet 114.

The distance 206, L, may be referred to as a coverage length. The width 202, D, of the inlet 112 may be referred to as an opening size. The width 202, D, and the distance 206, L, may be selected so as to have a predetermined ratio between L and D. The predetermined ratio may be referred to as an L to D (L/D) ratio. The L/D ratio may be in a range of 0.5 to 10. Configuring the airfoil 103 so that the L/D ratio falls in the range of 0.5 to 10 may help supply sufficient cooling air to the end 120, 121 of the airfoil 103. Although FIG. 2 illustrates the outlet 124 at the tip 120 of the airfoil 103, an L/D ratio in the range of 0.5 to 10 may also be appropriate for the outlet 124 located at the base 121 of the airfoil 103.

The inlet 112 or multiple inlets may be positioned at various locations on the outer surface 110 of the spar 104. In some examples, the size, shape, orientation, and positioning of each of the inlets may differ, resulting in a unique L/D ratio for each of the inlets. Additionally or alternatively, groups of inlets with similar or the same L/D ratios may be positioned in particular regions of the airfoil 103. For example, a series of inlets may be positioned along the tip 120 of the spar 104 with similar or the same L/D ratios.

The exposure 208 may be a distance between the edge 118 of the cover sheet 114 and the end 120, 121 of the spar 104. The edge 118 of the coversheet 114 may be offset from the end 120, 121 of the spar 104 by the exposure 208. For example, the edge 118 of the coversheet 114 may be recessed from the tip 120 of the spar 104 resulting in an exposure in a range of 0.30 to 3 millimeters. As the tip 120 of the spar 104 is worn with use, the exposure 208 may decrease. For example, the exposure 208 for a blade may be N millimeters when the blade is manufactured and N–P millimeters after initial use where P represents a portion of the tip 120 worn during initial use.

The break-in portion 209 may be a portion of the spar 104 configured to conform to the surface 216 of the chamber wall 214 during initial and/or subsequent use. The break-in portion 209 may have a first outer surface 210 at the tip 120 of the spar 104 when the airfoil 103 is initially installed. After an initial break-in period in which the airfoil 103 is first used, the break-in portion 209 may be worn down replacing the first outer surface 210 with a second outer surface 212 that is closer to the base 121 of the spar 104 than the first outer surface 210 was. Accordingly, the tip 120 of the spar 104 may shift from the first outer surface 210 of the break-in portion 209 to the second outer surface 212 as the break-in portion 209 conforms to the surface 216 of the chamber wall 214. For example, a blade in a turbine engine may include the break-in portion 209 at the tip 120 of the blade in order to compensate for non-uniformities in the surface 216 of the chamber wall 214 or to compensate for other variances in the installation.

Figure 3:
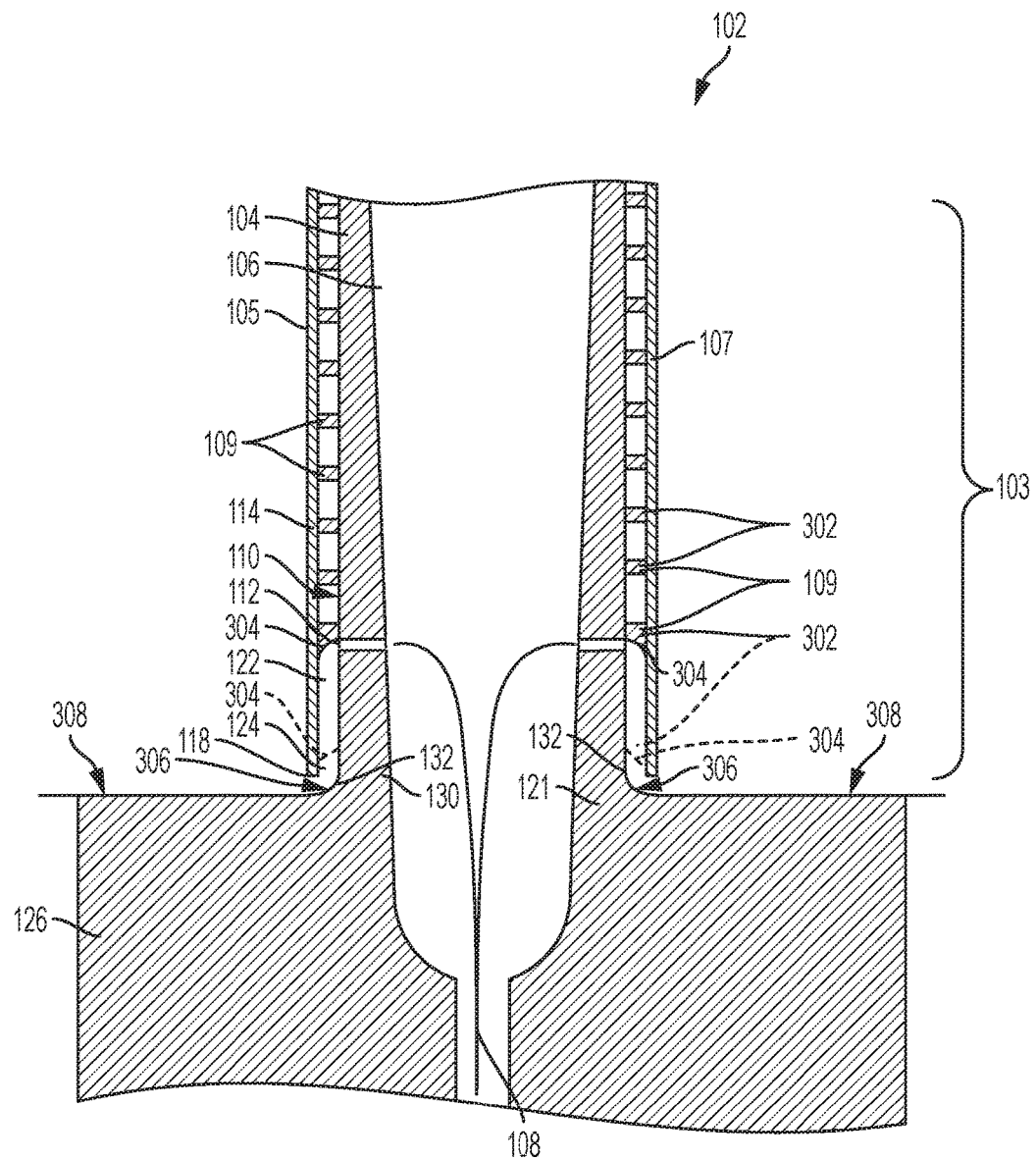
FIG. 3 illustrates an example of a cross-sectional view of the base of the spar, pedestals, and coversheet and the footing in the airfoil cooling system.

FIG. 3 illustrates an example of a cross-sectional view of the base 121 of the spar 104 and the footing 126 in the airfoil cooling system 102. The airfoil cooling system 102 for the airfoil 103 may comprise the spar 104 and the footing 126 that may extend radially from the spar 104. The spar 104 may comprise the passageway 106 for the cooling fluid, a pedestal arrangement 302 on the outer surface 110 of the spar 104, and the inlet 112. The inlet 112 may be configured to direct the cooling fluid 108 from the passageway 106 to the cooling path 122. The cooling path 122 may be defined by the outer surface 110 of the spar 104 and/or the pedestal arrangement 302. The cooling path 122 may be configured to guide the cooling fluid 108 from the inlet 112 to the outlet 124 that opens toward the footing 126. The airfoil 103 may further comprise the coversheet 114 coupled to the pedestals 109 of the pedestal arrangement 302. The pedestals 109 at the edge 118 of the coversheet 114 and at the inlet 112 may have a tapered portion 304. The fillet 132 may be defined along the intersection 130 of the spar 104 and the footing 126. The fillet 132 may include an outer surface 306. The footing 126 may include an outer surface 308. The airfoil 103 includes the suction side 105 and the pressure side 107.

The pedestal arrangement 302 may comprise an arrangement of any of the pedestals 109. The pedestal arrangement 302 may include one or more of the pedestals 109 of varying shapes and sizes at various locations on the spar 104. The pedestal arrangement 302 may vary across the outer surface 110 of the spar 104 on the suction side 105, pressure side 107, leading edge 111, and/or trailing edge 113. The outer surface 110 of the spar 104 may include one or more pedestal arrangements. For example, the pedestal arrangement 302 at the tip 120 of the spar 104 may be define a series of unobstructed cooling paths while the pedestal arrangement 302 at the base 121 of the spar 104 may include a pattern of circular pedestals that indirectly guide the cooling fluid 108 toward the outlet 124.

The tapered portion 304 of the pedestals 109 may be portion of any of the pedestals shaped to direct cooling fluid 108. The tapered portion 304 may define a portion of the cooling path 122. Additionally or alternative the tapered portion 304 may define a portion of the outlet 124. The tapered portion 304 may direct the cooling fluid 108 along the cooling path 122 toward an end 120, 121 of the spar 104. For example, the tapered portion 304 at the inlet 112 may direct the cooling fluid 108 toward the base 121 of the spar 104. As another example, the tapered portion 304 defining a portion of the outlet 124 may direct the cooling fluid 108 onto the fillet 132. An example of the tapered portion 304 includes a rounded, semi-circular surface. The tapered portion 304 may include other regular and non-regular shapes.

The cooling path 122 may be configured to guide the cooling fluid 108 from the inlet 112 to the outlet 124. The cooling path 122 may be defined by the outer surface 110 of the spar 104, the inner surface 116 of the coversheet 114, and the pedestal arrangement 302, alone or in combination. The cooling path 122 may be configured to direct the cooling fluid 108 from the inlet 112 onto the outer surface 110 of the spar 104, the outer surface 306 of the fillet 132, and the outer surface 308 of the footing 126, alone or in combination. For example, the pedestal arrangement 302 and the outer surface 110 of the spar 104 may define the cooling path 122 where the tapered portion 304 of the pedestal at the inlet 112 directs the cooling fluid 108 toward the footing 126. As another example, the pedestal arrangement 302 may define the cooling path 122 where the tapered portion 304 of one of the pedestals 109 at the base of the spar 104 directs the cooling fluid 108 onto the fillet 132.

The outlet 124 may open towards the footing 126. The outlet 124 may direct the cooling fluid 108 onto the outer surface 110 of the spar 104, the outer surface 306 of the fillet 132, and the outer surface 138 of the footing 126, alone or in combination. The outlet 124 may be defined by the outer surface 110 of the spar 104, the pedestal arrangement 302, the tapered portion 304 of a pedestal, and the inner surface 116 of the coversheet 114, alone or in combination. For example, the outlet 124 may be defined at the edge 118 of the coversheet 114 by the pedestal arrangement 302, the outer surface 110 of the spar 104, and the coversheet 114. As another example, the outlet 124 may be defined on the tapered portion 304 of one of the pedestals 109 at the base 121 of the spar 104. As another example, the outlet 124 may be defined by the outer surface 110 of the spar 104 and the pedestal arrangement 302.

The coversheet 114 may extend along the base 121 of the spar 104. The edge 118 of the coversheet 114 may be flush with the base 121 of the spar 104. Alternatively, the edge 118 of the coversheet 114 may be offset from the base 121 of the spar 104. For example, the edge 118 of the coversheet 114 may be recessed from the base 121 of the spar 104 in a range of 0.30 to 3 millimeters.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

Furthermore, the advantages described above are not necessarily the only advantages, and it is not necessarily expected that all of the described advantages will be achieved with every embodiment.

What is claimed is:

1. An airfoil for a gas turbine engine, the airfoil comprising:
   a spar comprising a passageway inside of the spar for a cooling fluid, a pedestal on an outer surface of the spar, and an inlet configured to direct the cooling fluid from the passageway to the outer surface of the spar; and
   a coversheet, wherein an inner surface of the coversheet is positioned on the pedestal of the spar, wherein an edge of the coversheet is positioned along a tip of the spar,
   wherein the inner surface of the coversheet, the pedestal, and the outer surface of the spar define a cooling path from the inlet to an outlet at the edge of the coversheet, wherein the coversheet, the pedestal, and the outer surface of the spar define an opening of the outlet, wherein the outlet is configured to direct the cooling fluid onto the tip of the spar, wherein the edge of the coversheet is flush with the tip of the spar and wherein the cooling path is unobstructed from the inlet to the outlet.

2. The airfoil of claim 1, wherein the airfoil is a blade.

3. The airfoil of claim 1, wherein the airfoil is a vane.

4. The airfoil of claim 1, wherein the inlet has a width, wherein a center of the inlet is located a distance from the edge of the coversheet, and wherein a ratio of the distance to the width is in a range of 0.5 to 20.

5. The airfoil of claim 1, wherein the pedestal of the spar comprises a plurality of pedestals on the outer surface of the spar.

6. The airfoil of claim 1, wherein the inner surface of the coversheet is conductively coupled to the pedestal.

7. An airfoil cooling system for an airfoil, the airfoil cooling system comprising:
   a spar, the spar comprising a passageway for a cooling fluid, a pedestal arrangement on an outer surface of the spar, and an inlet configured to direct the cooling fluid from the passageway to a cooling path defined by the outer surface of the spar and the pedestal arrangement;
   a coversheet positioned on the pedestal arrangement, wherein the cooling path is further defined by an inner surface of the coversheet; and
   a footing that extends radially from the spar,
   wherein the coversheet, at least one pedestal included in the pedestal arrangement, and the outer surface of the spar define an opening of an outlet, wherein the outlet is configured to direct the cooling fluid onto the footing, and wherein the cooling path is configured to guide the cooling fluid from the inlet to the outlet, which opens towards the footing.

8. The airfoil cooling system of claim 7, wherein an edge of the coversheet is positioned along the footing, wherein the inlet has a width, and a center of the inlet is located a distance from the edge of the coversheet, wherein a ratio of the distance to the width is in a range from 0.5 to 20.

9. The airfoil cooling system of claim 7, wherein an intersection of the spar and the footing form a fillet and the outlet directs the cooling fluid onto the fillet.

10. The airfoil cooling system of claim 7, wherein the airfoil is a vane and the footing is an endwall.

11. The airfoil cooling system of claim 7, wherein the airfoil is a blade and the footing is a platform.

12. The airfoil cooling system of claim 7, wherein the cooling path is configured to direct cooling fluid onto the footing.

13. An airfoil cooling system for an airfoil, the airfoil cooling system comprising:

a spar comprising a passageway for a cooling fluid, a pedestal on an outer surface of the spar, and an inlet configured to receive the cooling fluid from the passageway into a cooling path defined by the outer surface of the spar and the pedestal; and a coversheet, wherein an inner surface of the coversheet is positioned on the pedestal, wherein the cooling path extends from the inlet to an outlet, the outlet is configured to direct the cooling fluid from between the outer surface of the spar and the coversheet onto a tip of the spar, and, the inner surface of the coversheet further defines the cooling path, the outlet is located at an edge of the coversheet, and an opening of the outlet is defined by the coversheet, the outer surface of the spar, and the pedestal, wherein the edge of the coversheet is positioned along the tip of the spar, the edge of the coversheet is flush with the tip of the spar, and wherein the inlet has a width, a center of the inlet is located a distance from the outlet, and a ratio of the distance to the width is in a range from 0.5 to 20.

14. The airfoil cooling system of claim 13, wherein the inner surface of the coversheet is cast bonded to the pedestal of the spar.

15. The airfoil cooling system of claim 13, wherein the spar further comprises a plurality of cooling paths, a plurality of inlets, and a plurality of outlets, wherein each of the cooling paths extends from a corresponding one of the inlets to a corresponding one of the outlets, each of the outlets is configured to direct the cooling fluid from between the outer surface of the spar and the coversheet onto the tip of the spar, and the outlets are positioned along the tip of the spar.

* * * * *